US005773821A

United States Patent [19]
Jones

[11] Patent Number: 5,773,821
[45] Date of Patent: Jun. 30, 1998

[54] RADIOLOGICAL SURVEYING AS A METHOD FOR MAPPING FOSSILIZED BONE SITES

[75] Inventor: Ramal D. Jones, Sandy, Utah

[73] Assignee: University of Utah Research Foundation, Salt Lake City, Utah

[21] Appl. No.: 731,325

[22] Filed: Oct. 15, 1996

[51] Int. Cl.⁶ .................................................. G01V 5/00
[52] U.S. Cl. ................................... 250/253; 250/395
[58] Field of Search ....................... 250/253, 395

[56] References Cited

U.S. PATENT DOCUMENTS

3,008,046  11/1961  Carpenter ............................... 250/253
5,025,150  6/1991  Oldham et al. .......................... 250/253

*Primary Examiner*—Edward J. Glick
*Attorney, Agent, or Firm*—Trask, Britt & Rossa

[57] ABSTRACT

Radiological surveys for the discovery and mapping of subterranean fossilized relics, notably dinosaur bones utilize a detector shielded by a lead casing having a collimating window oriented approximately parallel and slightly above ground surface to receive gamma radiation traveling approximately vertically upward.

18 Claims, 8 Drawing Sheets

Instrument: Eberline Micro-R meter    Readings in uR/hr

N-W corner | | | | | | | | | | | | | | | N-E corner

| Feet | 149 | 146 | 143 | 140 | 137 | 134 | 131 | 128 | 125 | 122 | 119 | 116 | 113 | 110 | 107 | |
|---|---|---|---|---|---|---|---|---|---|---|---|---|---|---|---|---|
| 100 | | | Base of the hill | | | | | base of the hill | | | | | 1.1 | 1.9 | 1.8 | 1.7 | 100 |
| 97 | 1.2 | 1.8 | 2 | 2.2 | 1.5 | 1.5 | 1.4 | 2 | 1.5 | 1.2 | 1.6 | 1.6 | 1.4 | 1.8 | 2 | 1.5 | 1.9 | 97 |
| | | | | | 2 | | | | | | | | | | 2 | 1.8 | 1.7 | 1.8 |
| 94 | 1.4 | 1.7 | 1.6 | 1.7 | 1.9 | 1.6 | 1.4 | 1.8 | 1.4 | 1.3 | 1.6 | 1.8 | 1.6 | 1.8 | 1.4 | 1.6 | 2 | 1.5 | 1.9 | 94 |
| | | | | | | | | | | | 2 | | | 1.6 | 1.8 | 1.6 | 2 | 1.4 |
| 91 | 1.9 | 1.6 | 1.3 | 1.8 | 1.5 | 1.7 | 1.2 | 1.6 | 1.5 | 1.8 | 1.2 | 1.6 | 1.8 | 1.6 | 1.7 | 2 | 1.8 | 1.6 | 2 | 1.7 | 91 |
| | | | | | | | | | | | | 2 | | | 1.9 | 2 | 2 | 1.5 | 2 |
| 88 | 1.6 | 1.7 | 1.7 | 1.4 | 1.8 | 1.5 | 1.4 | 1.8 | 1.9 | 1.4 | 1.3 | 1.6 | 1.8 | 1.8 | 1.7 | 2 | 2.1 | 2 | 1.6 | 1.4 | 1.7 | 88 |
| 85 | 1.9 s | 1.2 | 1.5 | 2.2 | 1.4 | 2.5 | 1.8 | 1.6 | 1.4 | 1.4 | 1.7 | 1.5 | 1.8 | 1.8 | 1.6 | 2 | 2.2 | 2.4 | 2.2 | 2.2 | 1.2 | 1.6 | 85 |
| | t | | | | | | | | | | | | | | 1.9 | 2.4 | 2.2 | | | | |
| 82 | 1.2 e | 1.2 | 1.7 | 1.4 | 1.5 | 2.1 | 1.8 | 1.6 | 1.5 | 1.6 | 1.8 | 1.5 | 1.8 | 2 | 1.6 | 2 | 2.6 | 4.5 | 2.5 | 2.3 | 1.8 | 1.4 | 1.4 | 1.4 | 1.3 | 82 F |
| | a | | | | | | | | | 1.2 | | | | | | | 2 | 2.4 | 4 | 3.8 | 2 | 1.6 | 1.2 | 1.2 | 1.9 | e |
| 79 | 1.1 m | 1.5 | 1.9 | 1.6 | 1.9 | 2.2 | 1.8 | 2 | 1.9 | 1.5 | 1.6 | 1.3 | 1.5 | 1.8 | 2 | 1.8 | 2.6 | 3.6 | 2.7 | 1.9 | 1.8 | 1.8 | 1.8 | 1.1 | 1.3 | 79 e |
| | | | | | | | | 2.4 | 2.2 | | | | | | | | 1.6 | | 2 | 2.1 | 1.9 | 2 | 1.4 | 1.1 | 1.4 | t |
| 76 | 1 b a | 1.6 | 1.5 | 1.8 | 1.9 | 1.7 | 1.6 | 2 | 3 | | 1.3 | 1.5 | 1.6 | 1.2 | 2.4 | 1.8 | 1.4 | 2 | 2.1 | 1.7 | 1.6 | 1.6 | 1.4 | 1 | 1 | 76 |
| | n | | | | | | | | 7 | | | | | | | | | 1.6 | 1.2 | 1.3 | 1.8 | 1.6 | 2.8 | 1.1 | 1.3 | |
| 73 | 1.5 k | 1.6 | 1.8 | 1.8 | 1.8 | 1.4 | 1.6 | 1 | 1.6 | | | 1 | 1.3 | 1.2 | 1.4 | 1.2 | 1 | 1.8 | 1.2 | 2 | 1.1 | 1.6 | 2 | 1 | 1 | 73 |
| | | | | | | | | | | | | | | | | | | 1.4 | 1.8 | 1.2 | 1.1 | 1.5 | 2.6 | 1.4 | | |
| 70 | | 1.4 | 1.7 | 1.2 | 1.1 | 1.2 | 1.2 | 1.3 | 1.7 | 1.6 | 1 | 1.5 | 1.2 | 1.2 | 1.2 | 1.2 | 1.2 | 1.2 | 1.6 | 2.4 | 1.3 | 0.9 | 1 | 1 | 70 |
| stream bank | | | | | | | | | | | | | | | | | | | | | | | | | |
| 67 | 1.6 | 1 | 1.3 | 1.4 | 1 | 0.8 | 1.2 | | 1.1 | 1 | 1 | 1 | 1.3 | | 1 | 1.2 | | 1.2 | 2.2 | 1.4 | 1 | 1.2 | 1 sandstone | 67 |
| | dry stream bed | | | | | | | | | | | dry stream bed | | | | | | | | | 1.2 | 1.9 | 1.6 | | |
| 64 | 2 | 1 | 1.5 | 1.4 | 1.2 | 1 | | | | | | | | | | | | | | 1.2 | | | sandstone | 64 |
| | 4 | 3 | | | | | | | | | | | | | | | | | | | | | | |
| 61 | dry stream bed | | | | | | | dry stream bed | | | | | | | | | | | | | | sandstone | 61 |
| Feet | 149 | 146 | 143 | 140 | 137 | 134 | 131 | 128 | 125 | 122 | 119 | 116 | 113 | 110 | 107 | |

S-W corner | | | | | | | | | | | | | | | S-E corner

Instrument used: Eberline Micro-R meter    Readings in uR/hr

N-W corner                                                                                                                                    N-E corner

|       | A12 | A13 | A14 | A15 | A16 | A17 | A18 | A19 | A20 | A21 | A22 | A23 | A24 | A25 |       |
|-------|-----|-----|-----|-----|-----|-----|-----|-----|-----|-----|-----|-----|-----|-----|-------|
| -I10  | 1.4 | 1.5 | 1.3 | 1.2 | 1.2 | 1.2 | 1.1 | 1.2 | 1.3 | 1.5 | 1.4 | 1.2 | 1.3 | 1.6 | -I10  |
|       | 1.2 | 1.2 | 1.6 | 1.1 | 1   | 1.1 | 1.3 | 1.3 | 1.2 | 1.6 | 1.5 | 1.4 | 1.4 | 2   |       |
| -H9   | 1.3 | 1.4 | 1.4 | 1.3 | 1.4 | 1.3 | 1.4 | 1.3 | 1.6 | 1.4 | 1.6 | 1.5 | 1.4 | 1.4 | -H9   |
|       | 1.6 | 1.5 | 1.5 | 1.2 | 1.2 | 1.4 | 1.2 | 1   | 1.4 | 1.3 | 1.8 | 1.7 | 2   | 1.7 | 1.5   |
| -G8   | 1.4 | 1.2 | 1.4 | 1.4 | 1.6 | 1.2 | 1.6 | 1.4 | 1.3 | 1.4 | 1.3 | 1.5 | 1.4 | 1.6 | -G8   |
|       | 1.2 | 1.3 | 1.6 | 1.2 | 1   | 1.5 | 1.4 | 1.1 | 1.3 | 1.1 | 1.2 | 1.5 | 1.4 | 1.6 | 1.2   |
|       | 1.2 | 1.3 | 1.6 | 1.2 | 1   | 1.5 | 1.4 | 1.1 | 1.3 | 1.1 | 1.2 | 1.5 | 1.4 | 1.6 | 1.2   |
| -F7   | 1.3 | 1.3 | 1.4 | 1.3 | 1.1 | 1.3 | 1.1 | 1.2 | 1   | 1.3 | 1.3 | 1.4 | 1.5 | 1.2 | 1.8   |
|       | 1.2 | 1.4 | 1.2 | 1.7 | 1.6 | 1.6 | 1.5 | -F7 |     |     |     |     |     |     |       |
|       | 1.2 | 1.2 | 1.4 | 1.3 | 1.3 | 1.3 | 1.2 | 1.2 | 1.3 | 1.4 | 1.5 | 1.5 | 1.4 | 1.4 |       |
| -E6   | 1.2 | 1.2 | 1.6 | 1.6 | 1.5 | 1.2 | 1.2 | 1.5 | 1.2 | 1.5 | 1.4 | 1.3 | 1.4 | 1.4 | -E6   |
|       | 1.1 | 1.3 | 1.1 | 1.2 | 1   | 1.2 | 1.5 | 1.4 | 1.3 | 1.8 | 1.7 | 1.6 | 1.4 | 1.4 | 1.5   |
|       | 1.2 | 1.2 | 1.3 | 1.5 | 1.4 | 1.4 | 1.1 | 1.2 | 1.3 | 1.4 | 1.3 | 1.8 | 1.8 | 1.6 | 1.6   |
| -D5   | 1.4 | 1.3 | 1.4 | 1   | 1.4 | 1.4 | 1.3 | 1.1 | 1   | 1.2 | 1.3 | 1.4 | 1.6 | 1.4 | 1.7   |
|       | 1.4 | 1.6 | 1.4 | 1.6 | 1.2 | 1.6 | 1.2 | -D5 |     |     |     |     |     |     |       |
|       | 1.2 | 1.2 | 1.3 | 1.2 | 1.1 | 1.4 | 1.2 | 1.4 | 1.4 | 1.5 | 1   | 1.3 | 1.5 | 1.4 |       |
|       | 1.6 | 1.3 | 1.2 | 1.3 | 1.2 |     |     |     |     |     |     |     |     |     |       |
| -C4   | 1.5 | 1   | 1.4 | 1.3 | 1.7 | 1.5 | 1.2 | 1.4 | 1.3 | 1.2 | 1.4 | 1.3 | 1.5 | 1.8 | 1.8   |
|       | 1.5 | 1.6 | 1.3 | 1.1 | 1.8 | 1.5 | 1.4 | 1.4 | 1.2 | -C4 |     |     |     |     |       |
|       | 1.3 | 1.3 | 1.2 | 1.1 | 1.5 | 1.5 | 1.1 | 1.3 | 1.4 | 1.5 | 1.1 | 1.4 | 1.6 | 1.4 | 1.6   |
|       | 1.4 | 1.4 | 1.2 | 1.1 | 1.6 | 1.2 |     |     |     |     |     |     |     |     |       |
| -B3   | 1.5 | 1.3 | 1.2 | 1.4 | 1.6 | 1.4 | 1.2 | 1.4 | 1.5 | 1.5 | 1.3 | 1.4 | 1.2 | 1.2 | 1.3   |
|       | 1.5 | 1.4 | 1.2 | 1.4 | 1.4 | 1.1 | 1.4 | 1.2 | 1.6 | -B3 |     |     |     |     |       |
|       | 1.5 | 1.2 | 1.2 | 1.3 | 1.4 | 1.8 | 1.2 | 1.7 | 1.5 | 1.2 | 1.5 | 1.8 | 1.2 | 1.5 | 1.2   |
|       | 1.2 | 1.2 | 1.6 |     |     |     |     |     |     |     |     |     |     |     |       |
| -A2   | 1.6 | 1   | 1.1 | 1.2 | 1.4 | 1.2 | 1.6 | 1.2 | 1   | 1.4 | 1.4 | 1.2 | 1.2 | 2   | 1.3   |
|       | 1   | 1.8 | 1   | 1.2 | 1.2 | 1.2 | 1.4 | -A2 |     |     |     |     |     |     |       |
|       | 1.2 | 1.2 | 1.2 | 1.4 | 1.4 | 1.4 | 1.2 | 1.2 | 1.3 | 1.3 | 1.1 | 1.3 | 1.2 | 1.2 | 2     |
|       | 1.3 | 1   | 1.5 | 1.6 | 1.6 | 1.1 | 1.6 |     |     |     |     |     |     |     |       |
| A1    | 1.3 | 1.6 | 1.3 | 1.4 | 1.5 | 1.2 | 1.4 | 1.2 | 1.2 | 1.2 | 1.2 | 1.4 | 1.1 | 1.3 | 1.1   |
|       | 1.1 | 1.3 | 1.1 | 1.4 | 1.4 | 1.4 | 1.2 | A1  |     |     |     |     |     |     |       |
|       | 1.2 | 1.4 | 1.4 | 1.3 | 1.4 | 1.4 | 1.1 | 1.4 | 1.3 | 1.4 | 1   | 1.2 | 1.4 | 1.2 | 1.5   |
|       | 1.2 | 1.2 | 1.2 | 1.3 | 1.1 | 1.5 | 1.6 | 1.2 |     |     |     |     |     |     |       |

|       | A12 | A13 | A14 | A15 | A16 | A17 | A18 | A19 | A20 | A21 | A22 | A23 | A24 | A25 |       |
|-------|-----|-----|-----|-----|-----|-----|-----|-----|-----|-----|-----|-----|-----|-----|-------|
| B1    |     |     |     |     |     |     |     |     |     |     |     |     |     |     | B1    |
| S-W corner |     |     |     |     |     |     |     |     |     |     |     |     |     |     | S-E corner |

Meters

Fig. 12

Instrument used: Eberline Micro-R meter   Readings in uR/hr

N-W corner

| | A12 | A13 | A14 | A15 | A16 | A17 | A18 | A19 | A20 | A21 | A22 | A23 | A24 | A25 | |
|---|---|---|---|---|---|---|---|---|---|---|---|---|---|---|---|
| -I10 | | 1.6 | | | | | | | 1.6 | | | | 1.6 | | -I10 |
| | | | | | | | | | 1.6 | | | | | 2 | |
| -H9 | | | | | | | | 1.6 | 1.7 | 1.6 | | | | | -H9 |
| | 1.6 | | | | | | | | | | | | | | |
| -G8 | | 1.6 | | 1.6 | 1.6 | | | | | | 1.7 | 2 | 1.6 | | -G8 |
| | | | | | | | | | | | 1.6 | 2 1.6 | | | |
| -F7 | | 1.6 | | | | | | | | 1.8 | 1.7 | 1.6 | 1.6 | | -F7 |
| | | | | | | | | | | | 1.6 | 1.6 | | | |
| -E6 | 1.6 | 1.6 | | | | | | | | 1.7 | 1.7 | 1.6 | | | -E6 |
| | | | | | | | | | | | | 1.6 | | | |
| -D5 | | | | | | | | 1.6 | 1.8 | 1.8 | 1.6 | 1.7 1.6 | 1.6 | 1.6 | 1.6 -D5 |
| | | | | | | | | 1.6 | 1.6 | 1.7 | 1.8 | | | | |
| -C4 | | | | | | 1.6 | 1.8 | | | 1.8 | 1.8 | | | | -C4 |
| | | | | | | 1.6 | | | | | | | | | |
| -B3 | | | 1.7 | | | | | | 1.8 1.6 | 1.6 | | 1.6 | 1.6 | | 1.6 -B3 |
| | | | | | | | | | 1.8 | 1.6 | | | | | |
| -A2 | | | 1.6 | | | | 1.8 | | | 1.6 | 1.8 | | | | -A2 |
| -A2 | 1.6 | | | | | | 1.6 | | 1.8 | | 2 | 1.7 | 1.6 | | |
| A1 | | | | | | 1.6 | | | | | | 1.8 | 1.6 | | A1 |
| A1 | | 1.6 | | | | | | | | | 1.8 | 1.6 | 1.6 | 1.6 | |
| B1 | | | | | | | | | | | | | 1.6 | | B1 |
| | A12 | A13 | A14 | A15 | A16 | A17 | A18 | A19 | A20 | A21 | A22 | A23 | A24 | A25 | |

S-W corner       Meters       S-E corner N-E corner (upper right)

Fig. 13

RADIOLOGICAL SURVEYING AS A METHOD FOR MAPPING FOSSILIZED BONE SITES

BACKGROUND OF THE INVENTION

Priority Claim: Under the provisions of 35 U.S.C. §119 (e), this application claims the priority of Provisional Patent application Ser. No. 60/005,469, filed Oct. 16, 1995.

Field: This invention relates to geophysical survey methods; notably those relying upon the detection and quantification of radioactivity. It provides apparatus and methodology particularly suitable for radiological surveys directed to locating fossilized relics and for associating such relics with their discovery sites.

State of the Art: Geophysicists, geologists, paleontologists and others have long investigated various methods for surveying beneath the ground before commencing expensive and/or environmentally destructive excavation operations. Accurately locating fossilized relics, such as weed beds, petrified wood, buried bone, or other mineralized deposits would dramatically improve the efficiency of subsequent excavation operations, for example. As applied to paleontological digs, such foreknowledge would significantly shorten the time required to excavate bone, to determine if a bone site warrants a dig, or to determine the boundaries of a bone site. More accurate location of buried fossilized bone fragments would facilitates their nondestructive recovery. The avoidance of excessive digging would result in significantly less impact on the dig site environment.

Radiological surveying utilizes instruments that detect and measure the gamma radiation that is emitted by radioactive minerals and their decay products; notably the radionuclides of uranium and/or vanadium minerals. It is known that such minerals may be concentrated in a fossilized relic, such as bone, if those minerals were present in the ground water in contact with the relic during fossilization. The potential use of radiological survey instruments to map dinosaur bone sites has thus gained considerable attention over the past few years. Previous efforts have been unsuccessful, however.

A major impediment to the development of radiological survey techniques has been the presence of background radiation. The relics being sought are typically only slightly more radioactive than the background levels characteristic of the sites in which those relics are believed to be present. Moreover, the radiation levels which must be detected are very low, generally on the order of a few micro REM. Very sensitive instrumentation is required for detection of radiation of such low intensity. It has been the experience of those attempting to conduct radiological surveys to locate buried fossil relics, that the background radiation at the survey site overshadows the radioactivity sought to be detected. It has accordingly not been feasible to discriminate the radiation emanating from a discrete subterranean location. Under those circumstances, the survey results have been of no practical use.

SUMMARY

Generally, this invention may be regarded a radiological surveying method comprising the steps of (1) providing a gamma ray detector within a shielded housing having a collimating window, all structured and arranged to provide a shielded line of sight for the detector, (2) associating the shielded housing with a movable support, structured and arranged to hold the window at a selected orientation and elevation with respect to the surface of the earth when the support is positioned atop that surface, (3) positioning the support sequentially at a plurality of measurement positions atop the surface of the earth within a survey site, with the line of sight transverse that surface (Ideally, the support is positioned with the line of sight approximately normal the surface during the operations which determine the level of radioactivity at each of the measurement positions), (4) operating the detector at each of those measurement positions to determine the level of radioactivity at each such position, (5) determining the background radioactivity characteristic of the survey site and (6) determining those measurement positions within the survey site characterized by above-background radiological activity. The locations of the measurement positions characterized by above-background radiological activity may then be displayed in a format which correlates those locations to the topography of the survey site.

The invention may also be regarded as an improvement over previous radiological survey methods for determining the presence of subterranean relics within a survey site by detecting gamma rays emanating from the relics. The improvement involves detecting radiological activity at a plurality of measurement positions spaced throughout the survey sites by means which preferentially detect gamma rays traveling approximately parallel a line of sight within a collimated band, whereby to obtain measurement data at each such measurement position which excludes a substantial portion of the background radioactivity characteristic of the survey site and then using that data to determine those regions within the survey site which evidence an above-background level of radioactivity. Ideally, the gamma energy peaks for selected radionuclides characteristic of the relics are preferentially counted, whereby to exclude from the data additional portions of the background radioactivity.

More specifically, this invention provides radiological survey equipment specifically adapted to shield a detector counting low intensity gamma rays along a line of sight from background radiation adjacent that line of sight. The equipment of this invention collimates the gamma rays traveling along a chosen direction, typically vertically upward from an underground location. In a typical arrangement, a radiation detector is encased within a lead shield. The shield is provided with a collimating window, through which gamma radiation is permitted to pass. Radiation traveling in a direction much different than normal the window is excluded, as is radiation traveling parallel the axis of the window, but outside the perimeter of the window.

With the window positioned just slightly above and parallel the surface of the earth, the detector primarily receives gamma rays traveling vertically upward within a column having a cross sectional configuration congruent with the window. A typical window may comprise a one inch diameter opening through an end cap of a hollow lead cylinder containing the detector.

In a typical paleontological mapping procedure, the detector housing is mounted in a portable structure for easy transport within the boundaries of a potential dig site. The site may be laid out, or otherwise divided, into a pattern of measurement locations, usually in ranks and files, as in a grid of intersecting sets of parallel lines. For purposes of the mapping procedure, the surface of the earth may be considered to be an approximately horizontal planer surface. Measurements are taken approximately vertically at multiple locations, preferably at approximately evenly spaced grid intersections. The measurement technique comprises counting for a prescribed period of time to determine the ambient radiation level (e.g., expressed as μR/Hr.) The data, which includes background level measurements and above-background level measurements is processed appropriately to eliminate the background level measurements. An alternative procedure is to subtract from all measurements a "background component," thereby reducing all measurements sufficiently to eliminate the background level measurements (negative values being considered zero.) The remaining data may then be displayed or plotted as a map of the survey site, indicating those regions in which excavation would be expected to locate a fossilized relic.

The measurement data may be displayed or manipulated electronically, but manual recording, background-elimination and plotting procedures are often most practical. In practice, each site will have a characteristic background radiation level, depending upon historical volcanic activity and groundwater conditions. The level of concentration effected by relics, such as bones, undergoing fossilization is usually quite small compared to this background. Determining the background level, while somewhat subjective, is relatively simple to accomplish within practical limits.

The count data is conveniently displayed in grid format. Upon inspection, these data will generally inherently sort into high count and low count populations. Removing the low count population from the grid leaves a plan view display of boundaries within the survey site in which radioactive elements or their radioactive decay products have been concentrated. The probability of locating fossilized bones or other relics by digging within those boundaries is relatively high.

It is within contemplation to tune the detector to count gamma radiation of prescribed gamma ray energy levels, corresponding to those emitted by particular radionuclides. The selected radionuclides may be those known to be characteristic of subterranean relics in the survey site. It is also within contemplation to correlate the intensity and/or energy levels of radioactivity characteristic of specific relics with the site locations from which they were retrieved. A correlation of this kind has potential forensic applications.

BRIEF DESCRIPTION OF THE DRAWINGS

In the drawings, which illustrate what is currently regarded as the best mode for carrying out the invention.

FIG. 10 is map, plotting radiological readings taken at grid locations laid out across a second survey site;

FIG. 12 is map, plotting radiological readings taken at grid locations laid out across a third survey site.

DETAILED DESCRIPTION OF THE ILLUSTRATED EMBODIMENTS

Figures 1, 4:
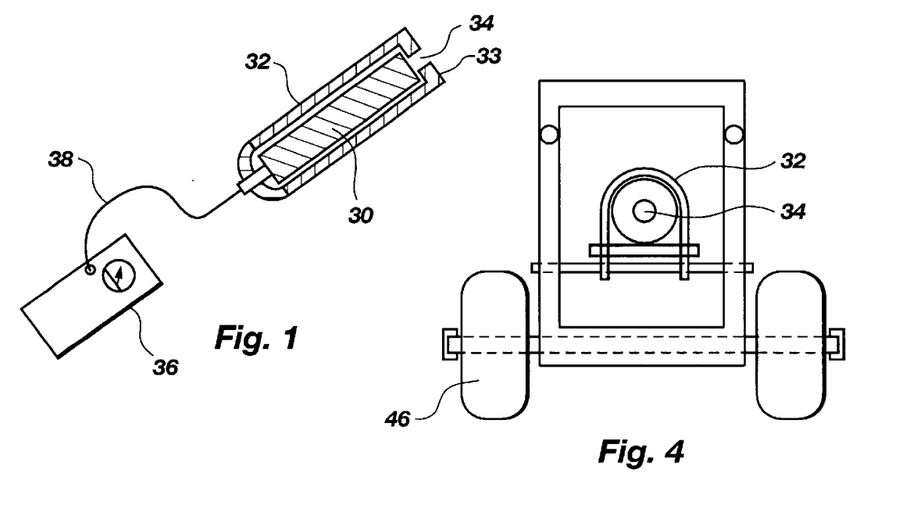
FIG. 1 is a schematic representation of a typical instrument configuration, including a shielded detector component of this invention, shown in section, and associated electronic components.
FIG. 4 is a bottom plan view of the assembly of FIGS. 2 and 3.

FIG. 1 illustrates a survey instrument used to take the survey measurements reported in the following examples. An Eberline Micro-R meter 30 was fitted with a ½ inch thick lead pig shield 32. The lead shield 32 is formed as a hollow cylinder with a closed end 33, provided with a 1 inch diameter window 34 for the detector. In practice, this window was effective to provide adequate directional collimation and reduction of background radiation. The lead shield configuration illustrated permitted the instrument to detect activity from bones which otherwise would have been masked by the normal background radiation at the respective sites. The detector 30 is connected to conventional electronic and read out components, generally 36, by means of an electronic instrument cable 38.

Figure 2:
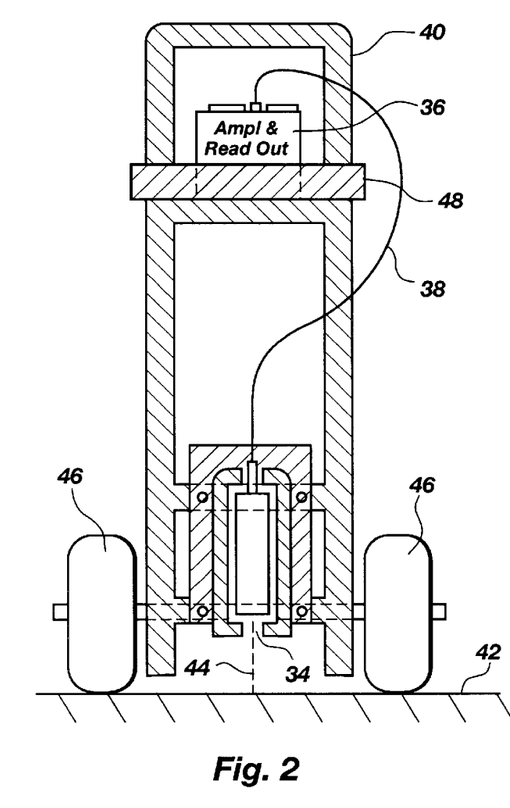
FIG. 2 is a front view, in elevation and partly in section, of a wheel-mounted assembly including the instrument of FIG. 1.
Figure 3:
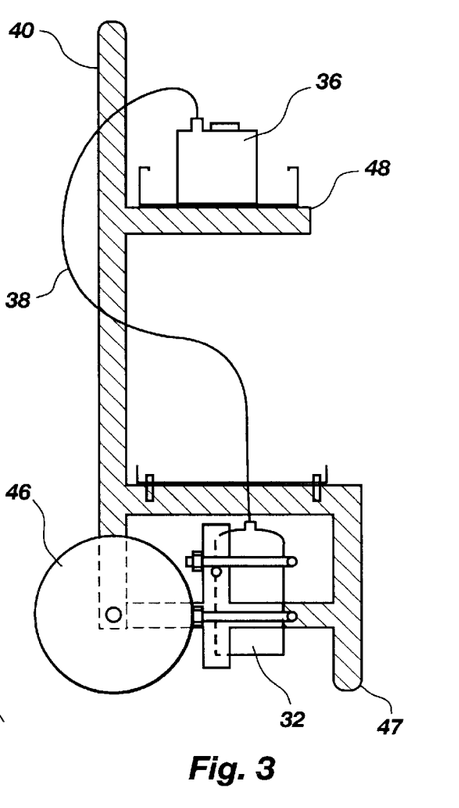
FIG. 3 is a side view, partly in section, of the assembly of FIG. 2.

The instrument of FIG. 1 is shown by FIGS. 2–4 configured as a fossilized bone locator. This arrangement collimates the gamma rays seen by the detector 30 and provides improved transition definition when the detector passes over a buried bone. The illustrated shielding configuration reduces the unshielded background in a typical site from 6 to 8 μR/hr down to 1.5 to 2 μR/hr, for example. This background reduction allows the detector 30 to define gamma radiation from fossilized bone, which is at such a low level as to otherwise be overshadowed by the normal background.

The lead shield 32 with detector 30 is shown mounted on a cart, generally 40, designed to position the detector window 34 approximately 10 cm from the ground surface 42, with a line of sight 44 approximately normal the surface 42. The geometrical relationship of the detector 30 to the ground is thereby held approximately constant. The frame 40 is supported by an axle 45 carrying spaced wheels 46 and a pair of legs 47. The electronic read out components 36 are carried in a support structure 48 mounted for convenient viewing, as shown.

Figure 5:
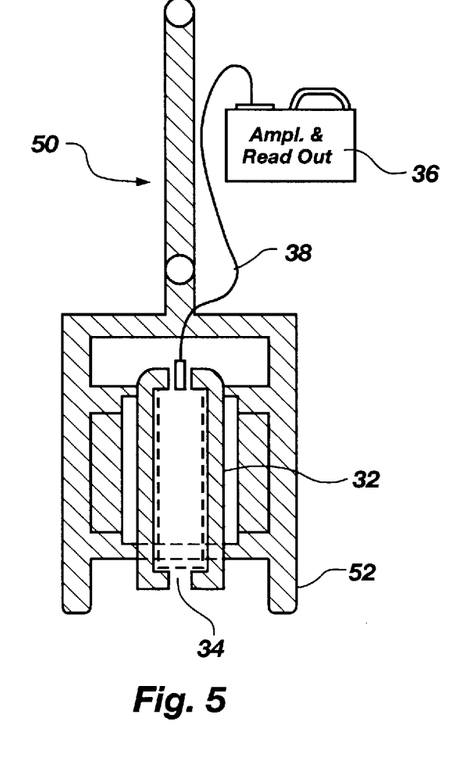
FIG. 5 is a front view, in elevation and partly in section, of a hand held assembly including the instrument of FIG. 1.
Figure 6:
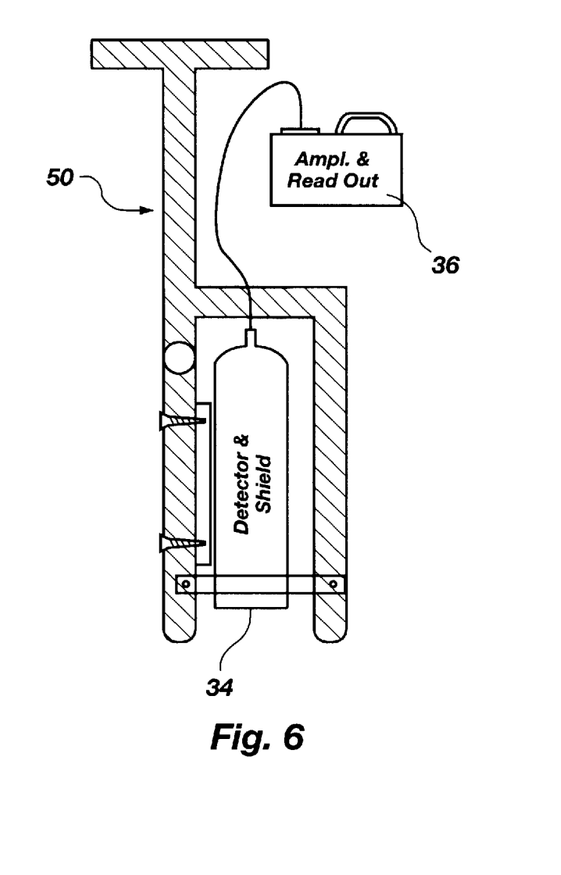
FIG. 6 is a side view, partly in section, of the assembly of FIG. 5.
Figure 7:
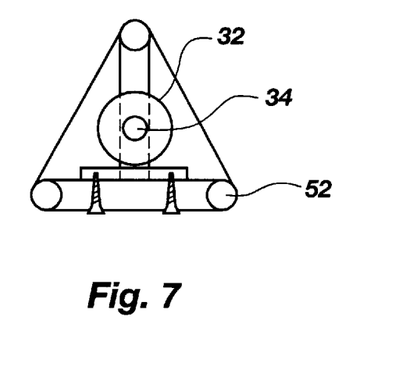
FIG. 7 is a bottom plan view of the assembly of FIGS. 5 and 6.

The instrument of FIG. 1 is illustrated by FIGS. 5–7 mounted in a holder, generally 50, configured for hand held portability. The frames, 40, 50, may conveniently be structured from round or rectilinear tubing, conduit or pipe; e.g. ¾ inch galvanized pipe. In any case, the hand held frame may be supported from three legs 52 in tripod fashion. The electronic components may be separately housed and transported, being connected to the detector 30 in the field by means of the cable 38.

EXAMPLE 1

A radiological survey was conducted with the fossilized bone detector of FIGS. 2–4. The section surveyed was laid out in a grid pattern with intersections of a first set of North-South lines with a second set of East-West lines. The actual survey site was 39 ft×40 ft. [61S-100N X 107E-147W—See FIG. 8] Fossilized bones had previously been recovered from this site. Readings were taken every 36 inches until higher than background readings were encountered. Then, the interval was reduced to 18 inches.

Figure 8:
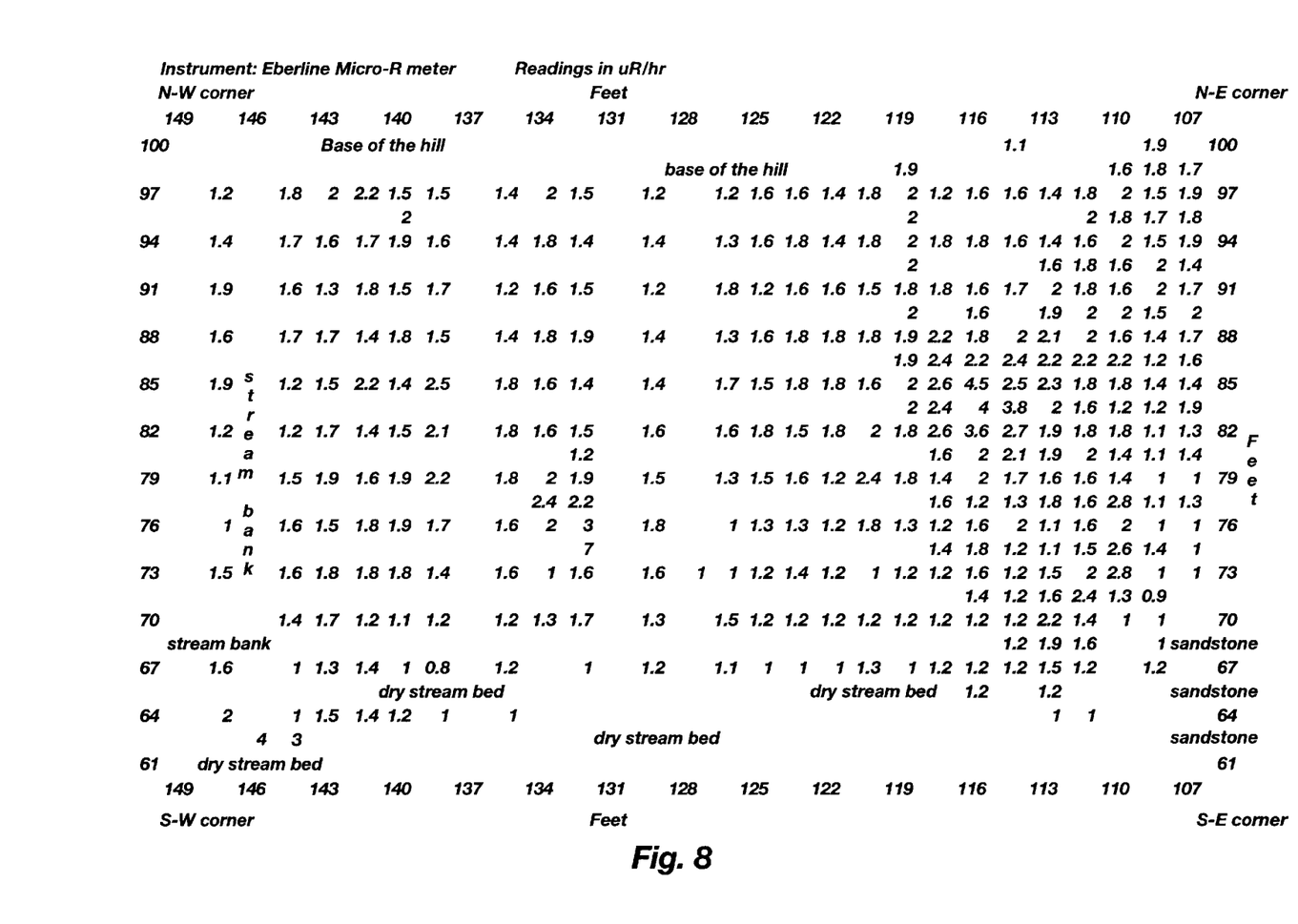
FIG. 8 is map, plotting radiological readings taken at grid locations laid out across a first survey site.

FIG. 8 presents data recorded during the radiological survey. The instrument background readings were 1.5+/–0.5

μR/hr. This low level minimized the background shadow, and allowed the instrument to detect relics having a relatively lower radioactivity level and relics at deeper subterranean levels.

Figure 9:
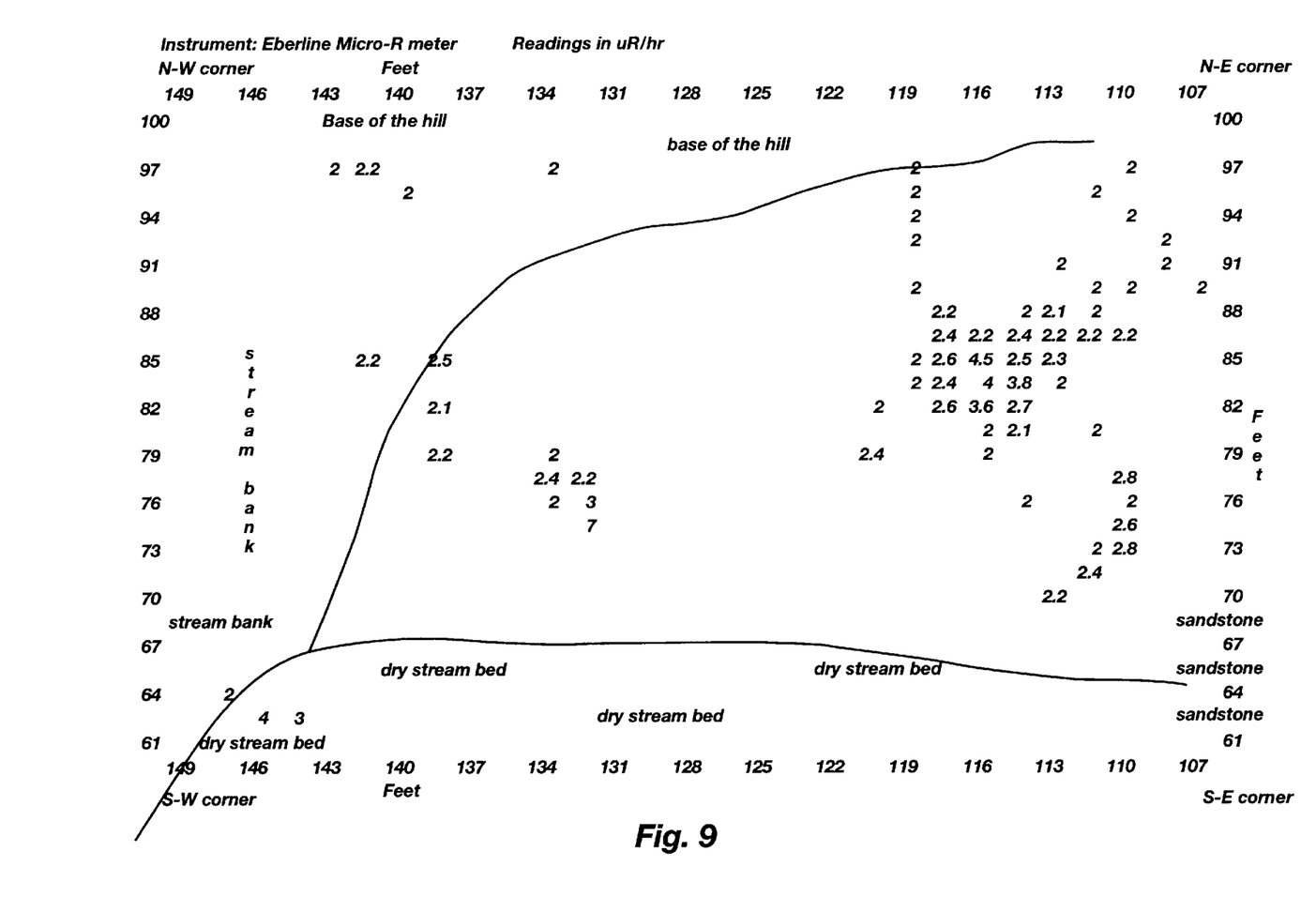
FIG. 9 is a map similar to FIG. 9, but with background readings removed to show potential relic locations.

FIG. 9 displays the data presented by FIG. 8 with the background readings removed. The survey indicated that fossilized bone remained in the area, even though such relics had been removed during previous digs. The survey also indicated bone in the southwest corner of the site, where relics had not previously been discovered. The bone specimens found in the southwest corner of the site are significant, because they were located below what had previously been thought to be the bottom layer of the bone bed. A mandible and maxilla found during a previous dig were resting on a very hard layer of Bentonite and loose conglomerate rock. It had thus been concluded that no fossilized bone would be found below that layer. These findings, plus a subsequent radiological survey showing above-background readings where the mandible and maxilla were found, suggests that additional bone may be found at deeper levels.

Bone fragment samples were collected and assayed to determine the amount and distribution of radioactivity in the bone. The amount of radioactivity in the relics collected from the site varied from 10 cpm/g to 180 cpm/g as shown in Table 1. The average concentration was 61 cpm/g. The radioactivity is believed to be derived from uranium-vanadium minerals. It is theorized that carbonaceous material in dinosaur bones acts as a host for the reduction and precipitation from solution of uranium and/or vanadium minerals.

TABLE 1

Bone Radioactivity Per Weight

| Description- | Gross Activity | Weight | Act./gram |
|---|---|---|---|
| Sample #1 | 205 cpm | 5 grams | 41 cpm/g |
| Sample #2 | 180 cpm | 5 grams | 36 cpm/g |
| Sample #3 | 0 cpm | 10 grams | 0 cpm/g |
| Sample #4 | 71 cpm | 10 grams | 7.1 cpm/g |
| Sample #5 | 12 cpm | 19 grams | 0.63 cpm/g |
| Sample #6 | 10 cpm | 34 grams | 0.3 cpm/g |
| Sample #7 | 637 cpm | 13 grams | 49 cpm/g |
| Sample #8 | 1065 cpm | 16 grams | 66 cpm/g |
| Average | | | 25 cpm/g |

All bone and Bentonite samples were counted utilizing a Nuclear Data Inc ND 62 Multichannel Analyzer with Princeton Gamma Tech Intrinsic Germanium detector. Each sample was counted for ten minutes. The net counts from gamma energy peaks at 75 Kev, 182 Kev, 242 Kev, 295 Kev, 352 Kev, and 612 Kev were used to determine gross activity. These peaks are representative of the radionuclides present in the bone samples. The gross activity was then divided by ten to convert the units to counts per minute (cpm).

To determine whether a radiological mapping technique is potentially useful for a particular bone site, one can use a statistical analysis of the radioactivity per gram of the bone. To attain maximum sensitivity, it is preferable to sum counts of selected gamma energy peaks, rather than taking a simple gross count of all gamma radiation. Counting only the selected gamma energy peaks for the radionuclides present in the bone excludes most of the instrument background, which results in greater sensitivity and better counting statistics.

EXAMPLE 2

A survey was conducted at a site in the Morrison formation, located approximately one mile south of the Cleveland-Lloyd Dinosaur Quarry, Emery County, Utah. The site has numerous bone fragments lying on the surface of the ground on the northeast boundary of the survey grid. The site had not previously been excavated.

Figure 11:
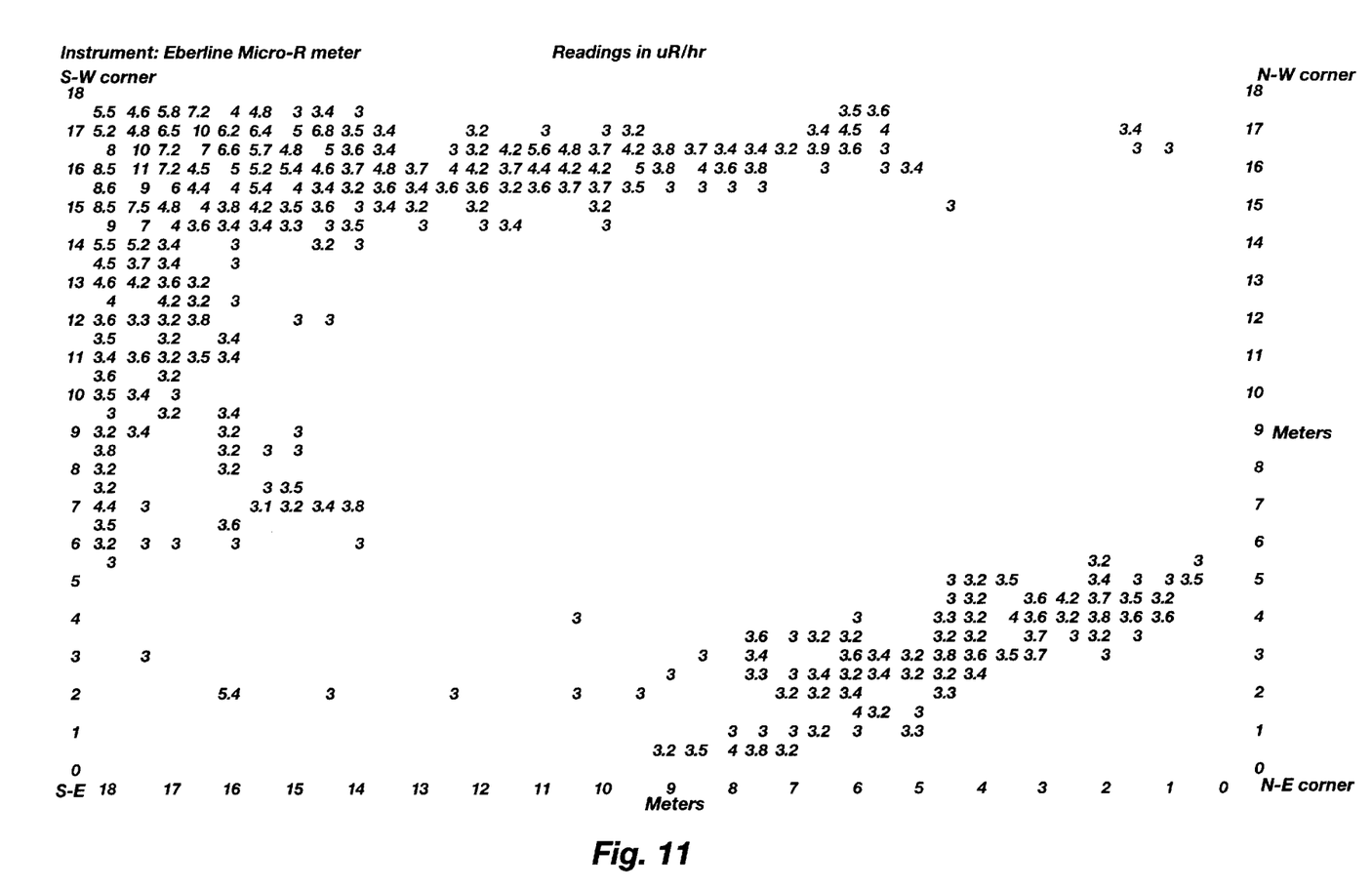
FIG. 11 is a map similar to FIG. 10, but with background readings removed to show potential relic locations.

The instrument used was that described in connection with Example 1. A grid 18×18 meters was laid out, and readings were taken every ½ meter. The resulting survey data is presented by FIG. 10. The background readings at this site were determined to be 1.5 μR/hr to 2.9 μR/hr. FIG. 11 displays the radiological survey data contained in FIG. 10 with the background level data removed. The above-background readings pinpoint areas of uranium concentration which could be indicative of fossilized bone relics.

Surface bone fragment samples were collected to measure the radioactive material content. The results of these measurements are reported in Table 2, and are expressed in radioactivity per gram. The highest sample read 2.2 counts per minute per gram (cpm/g) and the lowest read 0.2 cpm/g. The average was 1.46 cpm/g. These results indicate that bone relics have concentrated some radioactive material during fossilization.

TABLE 2

Bone Radioactivity Per Weight

| Description | Gross Activity | Weight | Act./gram |
|---|---|---|---|
| Sample #1 | 8 cpm | 39 grams | 0.2 cpm/g |
| Sample #2 | 216 cpm | 128 grams | 1.6 cpm/g |
| Sample #3 | 88 cpm | 47 grams | 1.9 cpm/g |
| Sample #4 | 64 cpm | 32 grams | 2.0 cpm/g |
| Sample #5 | 95 cpm | 43 grams | 2.2 cpm/g |
| Sample #6 | 95 cpm | 55 grams | 1.7 cpm/g |
| Sample #7 | 196 cpm | 200 grams | 1.0 cpm/g |
| Sample #8 | 165 cpm | 151 grams | 1.1 cpm/g |
| Average | | | 1.5 cpm/g |

It is recognized that any organic material in a reducing state appears to concentrate radioactive material. Therefore, the above-background readings could be coming from fossilized organic material other than bone. To determine the source of the radiation, two one-meter-square test pits were dug. One pit in the SE corner and another at the center point of the SE to NE boundary line are in areas of the highest readings. The first pit was dug to a depth of 40 cm with no bone being encountered. Radiation readings were taken at the surface and at 10 cm intervals with the results shown in Table 3. The matrix material on this site is Bentonite clay.

TABLE 3

Test Pit Radiation Readings in μR/hr

| Depth | A | B | C | D | E | F | G | H | I |
|---|---|---|---|---|---|---|---|---|---|
| 0 | 5.8 | 5 | 4 | 4 | 4.6 | 3.8 | 3.7 | 3.6 | 3.2 |
| 10 cm | 7 | 6 | 4.5 | 5 | 4.4 | 4.2 | 3.8 | 4 | 3.2 |
| 20 cm | 8 | 5.8 | 5.2 | 6.8 | 6 | 5 | 4.5 | 4 | 3.8 |
| 40 cm | 6 | 6.4 | 6.2 | | | | | | |

The radiation levels should increase as the depth increases, if a bone containing uranium is located at the bottom of the pit. The radiation given off by the uranium and/or vanadium in the bone is a gamma ray, which behaves as other forms of electromagnetic radiation. As a gamma ray travels though air or some other medium (shielding material), it interacts or collides with atoms of the medium. Each collision interaction results in the loss of energy. Thus, the gamma ray intensity is attenuated exponentially until it ceases to be detectable. The distance a gamma ray will travel is related to the original energy of the gamma ray and the density and atomic number of the medium or shielding material. Uranium emits gamma rays of various energy levels, from low energy gamma rays to high energy gamma rays. The higher the density and atomic number of the medium, the shorter distance the radiation travels. Therefore, the highest radiation levels detected should be at the surface of the radioactive material, after which the level detected would be expected to rapidly decrease as the travel path through air to the detector increases.

The radiological readings from test pit #1, as shown by Table 3, reveal no more than a nominal increase in radioactivity over a change in depth of 40 cm. Presumably, If there were fossilized bone or some other substance that concentrated the radioactive material, then the readings should have increased with depth. It was thus concluded likely that there is no bone in the proximity of the test pit #1.

To determine the level of the radioactivity in the soil, Bentonite samples were taken from test pit #1. The data reported in Table 4 indicate that there is a small amount of radioactivity in the soil, which is possibly attributable to fossilized decayed vegetation.

TABLE 4

Bentonite Samples Radioactivity Per Gram

| Description: | | | |
|---|---|---|---|
| Sample #1 | 13 cpm | 19 grams | 0.68 cpm/g |
| Sample #2 | 44 cpm | 35 grams | 1.25 cpm/g |
| Sample #3 | 15 cpm | 16 grams | 0.93 cpm/g |
| Sample #4 | 10 cpm | 9 grams | 1.11 cpm/g |
| Sample #5 | 25 cpm | 16 grams | 1.56 cpm/g |
| Sample #6 | 4 cpm | 17 grams | 0.23 cpm/g |
| Sample #7 | 9 cpm | 12 grams | 0.75 cpm/g |
| Average | | | 0.93 cpm/g |

Based upon the survey data, test pit data and soil analysis, this site was determined to be a poor candidate for excavation.

EXAMPLE 3

The instrument described in connection with Example 1 was used to survey a site located approximately ¼ mile west of, and at a higher elevation in the Morrison formation than, the Example 2 site. The matrix at this site is a hard Bentonite clay. There has been active digging on the site for a number of years, with fossilized bones generally being found within one foot from the ground surface. The fossil bones previously recovered from this site have been identified as belonging to a large sauropod.

Figure 13:
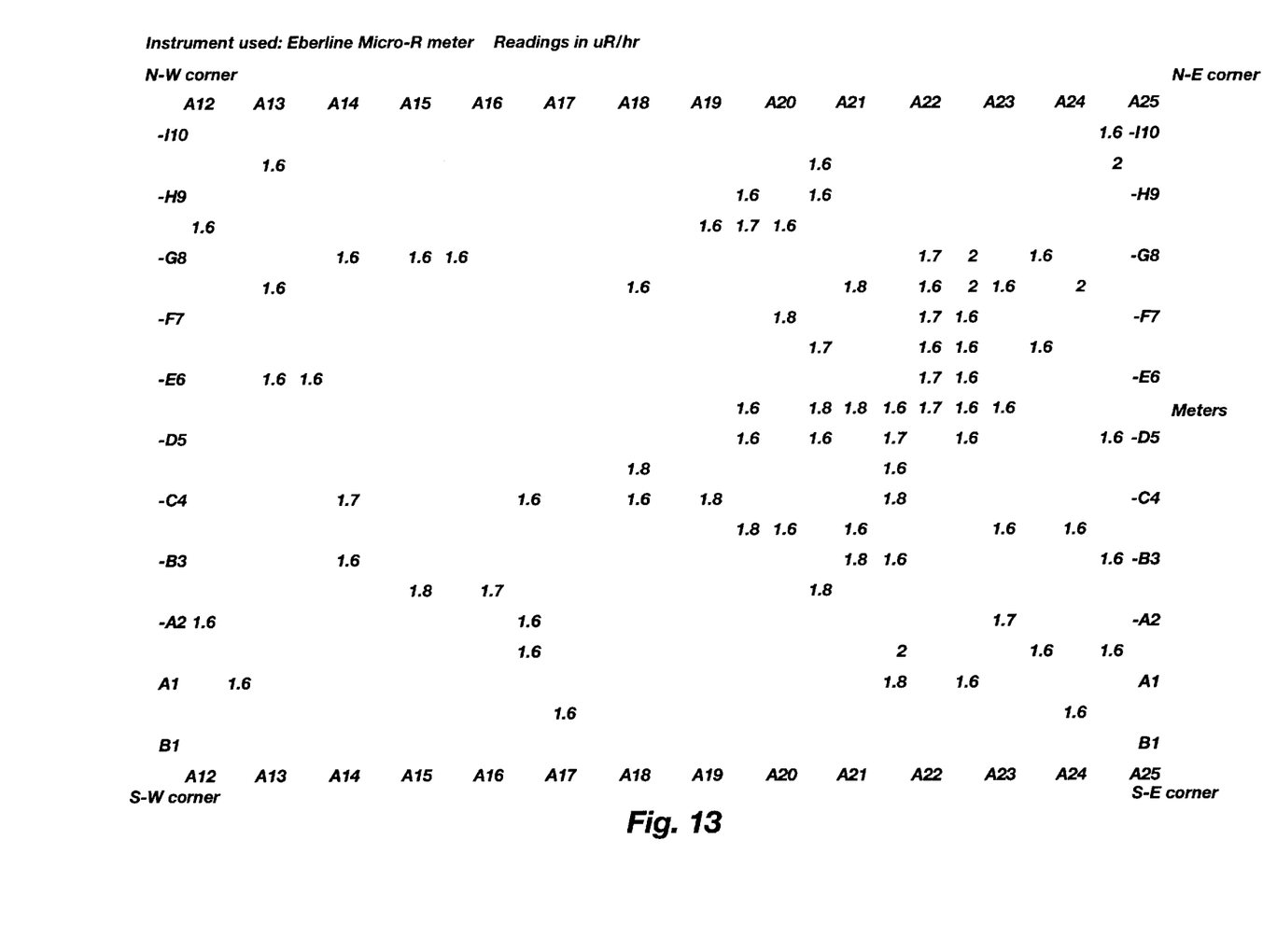
FIG. 13 is a map similar to FIG. 12, but with background readings removed to show potential relic locations.

The area surveyed was 10 meters×13 meters, with readings taken every meter. The radiological survey data is presented by FIG. 12. The instrument background readings were determined to be 1.25+/−0.25 μR/hr. FIG. 13 displays these data with the background readings removed.

Bone fragments were collected to determine the relative radioactivity of the bone. These data are reported in Table 5. The average radioactivity concentration in this set of samples is 0.4 cpm/g.

TABLE 5

Bone Radioactivity Per Weight

| Description: | Gross Activity | Weight | Act./gram |
|---|---|---|---|
| Sample #1 | 18 cpm | 41 grams | 0.44 cpm/g |
| Sample #2 | 19 cpm | 25 grams | 0.76 cpm/g |
| Sample #3 | 22 cpm | 82 grams | 0.27 cpm/g |
| Sample #4 | 21 cpm | 37 grams | 0.57 cpm/g |
| Sample #5 | 13 cpm | 38 grams | 0.34 cpm/g |
| Sample #6 | 10 cpm | 36 grams | 0.28 cpm/g |
| Sample #7 | 21 cpm | 46 grams | 0.46 cpm/g |
| Sample #8 | 16 cpm | 39 grams | 0.41 cpm/g |
| Sample #9 | 15 cpm | 57 grams | 0.26 cpm/g |
| Sample #10 | 67 cpm | 306 grams | 0.22 cpm/g |
| Average | | | 0.4 cpm/g |

At grid coordinates of A22, A1, there are readings of 2 μR/hr and 1.8 μR/hr. From this area a large 5 ft long femur was removed which produced the same readings after removal. The depth of this bone was only 10 cm. At that depth, the matrix covering the bone provided almost no attenuation of the gamma rays. Using an Eberline Micro-R meter with shielding such as that illustrated by FIG. 1, the radioactivity levels were determined of several specimens following recovery, as follows (the background radiation was determined to be 0.8 μR/hr):

Bone-295 (5 ft long femur) Readings: left-end 1.9 μR/hr, center 2.0 μR/hr, right-end 2.0 μR/hr.

Bone-355 (disc shaped bone) Readings: at 3 points around the circumference 1.8 μR/hr, 1.8 μR/hr, 1.8 μR/hr.

Bone-321 (?) Reading: 1.3 μR/hr

Bone-324 (?) Reading: 1.2 μR/hr

Bone-325 (?) Reading: 1.2 μR/hr

The radiological survey showed the locations of each of Bone-295 and Bone 355. The three other specimens were smaller, and gamma rays emitted by these specimens were overshadowed by the normal site background. To locate smaller bones with a higher degree of confidence, the sensitivity of the instrument needs to be increased, something readily achievable by those skilled in the art of constructing radiological detection instruments.

The use of radiological survey methods and instruments in accordance with this invention is effective in mapping bone locations, locating single bones, defining bone geometry, minimizing bone damage and minimizing unproductive digging in bare ground.

The limiting factors in the use of radiation measuring instruments on fossilized bone sites are (1) the radioactivity content of the bone, (2) the depth of the bone beneath the surface of the ground, and (3) the sensitivity of the radiation measuring instrument. Changing of any one of these three factors will influence whether a particular site is a good candidate for the use of radiation measuring instruments. For instance, the average radioactivity concentration of the relics recovered from various sites has ranged from between about 0.4 cpm/g to about 61 cpm/g. Surveying sites of low average radioactivity with the instruments used for the examples has been able to locate large relics which are very close to the ground surface. Smaller relics, with higher radioactivity content, have been detected at depths of 30 cm. It will be apparent that a higher sensitivity instrument enables the detection of bone relics with lower radioactivity content or bone located at greater depths.

The use of radiation measuring instruments, having the sensitivity of the fossilized bone locator used for the examples, for surveying a bone site is warranted if the radioactivity concentration of the bone is above 1.0 cpm/g and the bone depth is within 30 cm. The greater the bone mass and radioactivity, the greater the depth at which the bone can be detected. As the sensitivity of the radiation measuring instruments is increased, the number of bone sites that may benefit from these survey techniques will increase.

What is claimed is:

1. A radiological surveying method, comprising:

providing a gamma ray detector within a shielded housing having a collimating window, all structured and arranged to provide a shielded line of sight for said detector;

associating said shielded housing with a movable support, structured and arranged to hold said window at a selected orientation and elevation with respect to the surface of the earth when said support is positioned atop said surface;

positioning said support sequentially at a plurality of measurement positions atop said surface within a survey site, with said line of sight transverse said surface;

operating said detector at each said measurement position to determine the level of radioactivity at each said measurement position;

determining the background radioactivity characteristic of said survey site; and determining those measurement positions within said survey site characterized by above-background radiological activity.

2. A method according to claim 1, including the step of graphically displaying the locations of said measurement positions characterized by above-background radiological activity in a format which correlates said locations to the topography of said survey site.

3. A method according to claim 2, wherein said above-background radiological activity is displayed in grid format which correlates specific measurements of above-background level activity with the topographical location at which said measurement was taken.

4. A method according to claim 1, wherein said support is positioned sequentially at said plurality of measurement positions atop said surface with said line of sight approximately normal said surface during said operation to determine the level of radioactivity at each said measurement position.

5. A method according to claim 4, including the step of graphically displaying the locations of said measurement positions characterized by above-background radiological activity in a format which correlates said locations to the topography of said survey site.

6. A method according to claim 5, wherein said above-background radiological activity is displayed in grid format which correlates specific measurements of above-background level activity with the topographical location at which said measurement was taken.

7. A radiological surveying method, comprising:

providing a gamma ray detector within a shielded lead housing, said housing including a closed end cap, and said end cap being provided with a window adapted to admit gamma rays traveling approximately axially with respect to said window;

positioning said housing at a plurality of measurement positions within a survey site, with said window held approximately parallel and closely above the surface of the earth, whereby to detect gamma rays traveling approximately vertically up from a subterranean source of radioactivity;

operating said detector at each said measurement position to determine the level of radioactivity at each said measurement position; and determining those measurement positions within said survey site characterized by above-background radiological activity.

8. A method according to claim 7, including the steps of:

providing a display showing the locations of said measurement positions in a format which correlates said locations to the topography of said survey site;

determining the background radioactivity characteristic of said survey site; and indicating on said display those measurement positions within said survey site characterized by above-background radiological activity.

9. In the radiological survey method for determining the presence of subterranean relics within a survey site by detecting gamma rays emanating from said relics, an improvement comprising:

detecting radiological activity at a plurality of measurement positions spaced throughout said survey sites by means which preferentially detect gamma rays traveling approximately parallel a line of sight within a collimated band, whereby to obtain measurement data at each said measurement position which excludes a substantial portion of the background radioactivity characteristic of said survey site; and using said data to determine those regions within said survey site which evidence an above-background level of radioactivity.

10. An improvement according to claim 9, wherein the gamma energy peaks for selected radionuclides characteristic of said relics are preferentially counted, whereby to exclude from said data additional portions of said background radioactivity.

11. In the method for locating buried relics within a survey site characterized by low level background radiation, wherein the relics emit low level gamma ray radiation, on the order of a few micro REM, and wherein the method includes determining the radiation levels at a plurality of surface locations across said site, the improvement comprising:

determining said radiation levels by detection means structured to provide a narrow collimated band of gamma ray radiation traveling in a selected direction to a gamma ray detector; said means including:

a shield for said detector, structured and arranged substantially to exclude background radiation traveling in directions other than said selected direction; and a transportable support system structured and arranged to position said shield approximately identically with respect to the earth's surface at each of said plurality of surface locations.

12. An improvement according to claim 11, wherein:

said shield comprises a housing having a collimating window, and is structured and arranged to provide a shielded line of sight for said detector; and said housing is associated with said transportable support system, said support system being structured and arranged to hold said window at a selected orientation and elevation with respect to the surface of the earth when said support system is positioned atop the earth's surface at any of said plurality of surface locations; said improvement further comprising the steps of:

positioning said support system sequentially at said plurality of surface locations, with said line of sight transverse the surface of the earth;

operating said detector at each said surface location to determine the level of radioactivity at each said location;

determining the background radioactivity characteristic of said survey site; and determining those surface locations within said survey site characterized by above-background gamma ray activity.

13. An improvement according to claim 12, further including the step of graphically displaying said surface locations characterized by above-background radiological activity in a format which correlates said locations to the topography of said survey site.

14. An improvement according to claim 13, wherein said above-background radiological activity is displayed in grid format which correlates specific measurements of above-background level activity with the topographical location at which said measurement was taken.

15. An improvement according to claim 12, wherein said support system is positioned sequentially at said plurality of surface locations with said line of sight approximately normal the surface of the earth during said operation to determine the level of radioactivity at each said surface location.

16. An improvement according to claim 15, further including the step of graphically displaying said surface locations characterized by above-background radiological activity in a format which correlates said locations to the topography of said survey site.

17. An improvement according to claim 16, wherein said above-background radiological activity is displayed in grid format which correlates specific measurements of above-background level activity with the topographical location at which said measurement was taken.

18. An improvement according to claim 11, comprising:

providing said gamma ray detector within a shielded lead housing, said housing including a closed end cap, and said end cap being provided with a window adapted to admit gamma rays traveling approximately axially with respect to said window; and positioning said housing at said plurality of said surface locations within said survey site with said window held approximately parallel and closely above the surface of the earth, whereby to detect gamma rays traveling approximately vertically up from a subterranean source of radioactivity.

* * * * *